United States Patent [19]

Makino

[11] Patent Number: 5,134,037
[45] Date of Patent: Jul. 28, 1992

[54] METALLIC POWDER MOLDED ARTICLE AND MANUFACTURING METHOD THEREFOR

[75] Inventor: Katsumi Makino, Inazawa, Japan

[73] Assignee: Mitsubishi Denki Kabushiki Kaisha, Japan

[21] Appl. No.: 645,695

[22] Filed: Jan. 25, 1991

[30] Foreign Application Priority Data

Jan. 25, 1990 [JP] Japan .................................. 2-13651

[51] Int. Cl.⁵ .............................................. B22F 3/00
[52] U.S. Cl. ................................... 428/551; 428/558; 428/564; 428/469
[58] Field of Search ................ 428/558, 551, 564, 469

[56] References Cited

U.S. PATENT DOCUMENTS

| | | | |
|---|---|---|---|
| 4,608,225 | 8/1986 | Sakuramoto et al. | 428/551 |
| 4,729,871 | 3/1988 | Morimoto et al. | 428/558 |
| 4,917,960 | 4/1990 | Hornberger et al. | 428/558 |

FOREIGN PATENT DOCUMENTS 57-135861  8/1982  Japan .

*Primary Examiner*—Stephen J. Lechert, Jr.
*Attorney, Agent, or Firm*—Leydig, Voit & Mayer

[57] ABSTRACT

A process for manufacturing a metallic powder molded article comprising the steps of preparing a mixture of inflammable metallic powders and synthetic resin and molding under pressure and heat the mixture to form a molded body. Pressure and heat are applied such as by buffing onto a surface of the molded body to deform and bond together the metallic powders on the molded body surface to form a substantially continuous metallic surface. A plated layer may be applied on the continuous metallic surface. The process manufactures a metallic powder molded article comprising a molded body of a mixture of inflammable metallic powders and synthetic resin having a substantially continuous metallic surface defined by the metallic powders compacted and bonded together.

2 Claims, 3 Drawing Sheets

METALLIC POWDER MOLDED ARTICLE AND MANUFACTURING METHOD THEREFOR

BACKGROUND OF THE INVENTION

This invention relates to a metallic powder molded article and a process for manufacturing the same and, more particularly, to a metallic powder molded article for use in elevator landing floor doors, interior and exterior articles for buildings, air-conditioner panels or the like.

As one example of a metallic powder molded article to which the present invention pertains, a metallic powder containing sheet material as disclosed in Japanese Pat. Laid-Open No. 57-135861 is known. This metallic powder containing sheet material is manufactured by molding a mixture of a thermo-plastic resin and oxidized metal powders into a sheet configuration.

Such conventional metallic powder containing sheet is superior in moldability, regidity, dimensional stability relative to heat, vibration dumping effect, sound shield effect, mechanical characteristics and fire resistivity. However, such sheet cannot be used in elevator application field or an application field where heat-resistance and inflammability are necessary. Also, if a metallic sheet pressing or a molten metal molding is used to form a sheet, the heat or fire resistivity become high although the configuration is limited to a relatively simple form and easiness of forming is degraded. With the molten metal molding, thin-wall article and light weight houses are difficult, unsatisfactory and not suitable for use in mass production and poor in economy.

SUMMARY OF THE INVENTION

Accordingly, one object of the present invention is to provide a metallic powder molded article free from the above discussed problems.

Another object of the present invention is to provide a metallic powder molded article which has good heat and fire resistivity.

Another object of the present invention is to provide a metallic powder molded article which has good heat and fire resistivity without degrading other desirable properties of the conventional metallic powder molded articles.

Another object of the present invention is to provide a metallic powder molded article on which a metal plating is easily applicable.

Another object of the present invention is to provide a method for manufacturing a metallic powder molded article which has good heat and fire resistivity.

With the above objects in view, the metallic powder molded article of the present invention comprises a molded body of a mixture of inflammable metallic powders and synthetic resin which may be 10% to 20%. The molded body has a substantially continuous metallic surface defined by the metallic powders compacted and bonded together. This surface may be coated by a plated metal layer.

According to another aspect of the present invention, a process for manufacturing a metallic powder molded article is provided, in which a mixture of inflammable metallic powders and synthetic resin is prepared, and the mixture is molded under pressure and heat to form a molded body. Pressure and heat are applied onto a surface of the molded body, such as by buffing, to deform and bond together the metallic powders on the molded body surface to form a substantially continuous metallic surface. If desirable, the continuous metallic surface may be metal plated.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
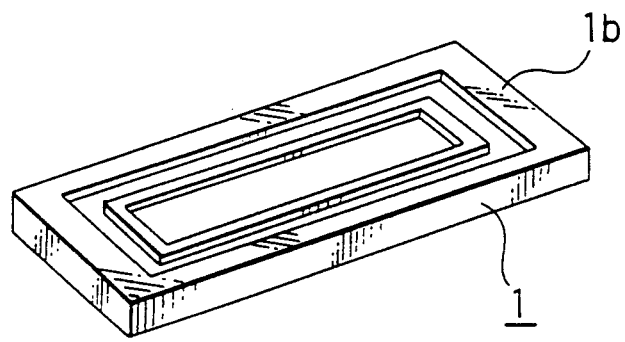
FIG. 1 is a perspective view illustrating the metallic powder molded article of an embodiment of the present invention.
Figure 2:
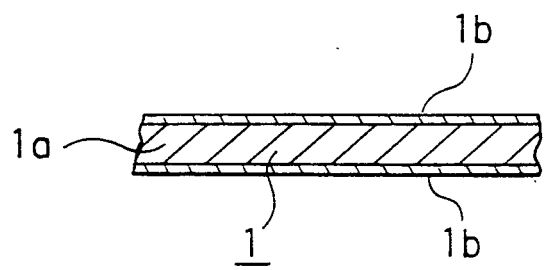
FIG. 2 is a fragmental sectional view of the metallic powder molded article illustrated in FIG. 1.
Figure 3:
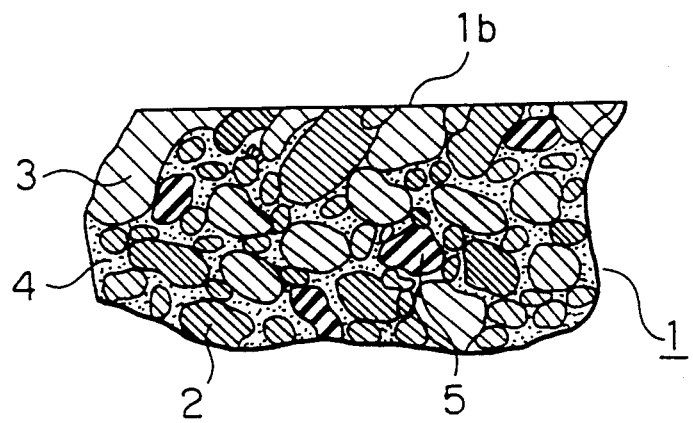
FIG. 3 is an enlarged sectional view of one portion of the molded article illustrated in FIG. 2.

In FIGS. 1 and 2, a metallic powder molded article 1 comprises a molded body 1a and a substantially continuous metallic surface layer 1b disposed on the molded body 1a. As illustrated in FIG. 3. the molded body 1a is made of a mixture of inflammable metallic powders including stainless steel powders 2 and aluminum powders 3, inflammable non-metallic powders such as ceramic powders 5 and thermo-plastic synthetic resin 4 such as melamine resin. In one embodiment, the amount of the stainless steel powder 2 is equal to the amount of the aluminum powder 3, the amount of the ceramic powers 5 is smaller than that of the stainless steel powders 2, and the amount of the melamine resin 4 is about 10% to 20% of the mixture.

The metallic surface layer 1b is defined by the metallic powders 2 and 3 compacted and bonded together on the surface of the molded body 1a. This metallic surface layer 1b is formed by buff polishing a surface of the molded body 1a to deform the metallic powders 2 and 3 located in the body surface by pressure and heat. The metallic surface layer 1b may be further coated with a plated metal layer such as an aluminum oxide layer (not shown).

Figure 4:
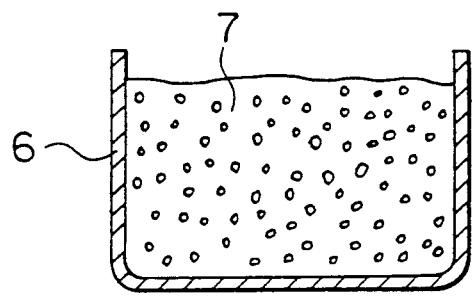
FIG. 4 is a schematic sectional view of a mixture of metallic powders and resin illustrating one step of manufacturing method of the article.

The metallic powder molded article described and illustrated in conjunction with FIGS. 1 to 3 is manufactured by first preparing a mixture 7 of the stainless steel powders 2, the aluminum powders 3, the melamine resin powders 4 and the ceramic powders 5 within a vessel 6 in the proportion described above as illustrated in FIG. 4. Although not illustrated, the melamine resin 5 in the mixture 7 in the vessel 6 of FIG. 4 is still in the form of powders in this state.

Figure 5:
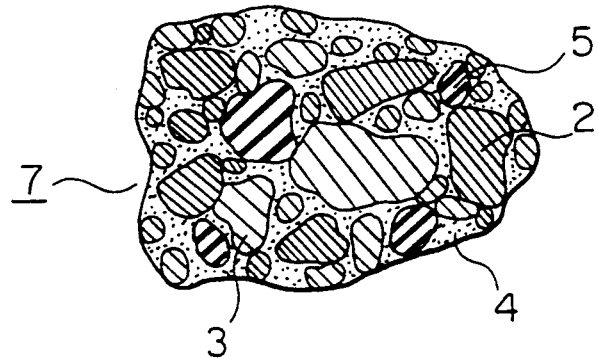
FIG. 5 is an enlarged sectional view of one portion of FIG. 4.
Figure 6:
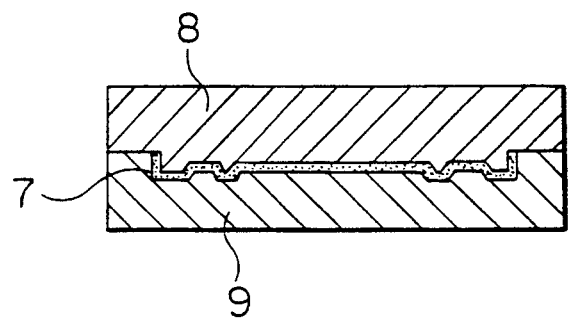
FIG. 6 is a sectional view illustrating how the mixture is molded.
Figure 7:
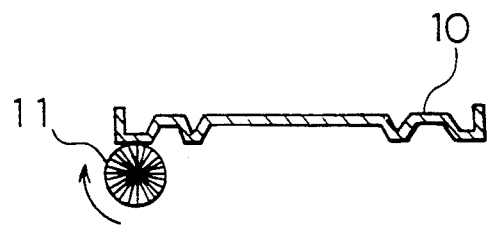
FIG. 7 is a schematic sectional view illustrating how the molded article is buff-polished.

As illustrated in FIG. 6, the mixture 7 thus prepared is placed between an upper and a lower dies 8 and 9 and is molded under pressure and heat to form a molded body 10 of a desired shape such as illustrated in FIG. 7. In this state, the melamine resin 5 in the mixture 7 is transformed so that the molded body 10 exhibits a cross section as illustrated in FIG. 5.

The molded body 10 is then subjected to buffing with a wire brush 11 rotating at a high speed as illustrated in FIG. 7 in such a manner that pressure and heat are applied onto a surface of the molded body 10 to deform and bond together the metallic powders 2 and 3 on the molded body surface to form a substantially continuous metallic surface layer 1b converted and different from the inner molded body 1a of the metallic powder molded article 1. As seen from FIG. 3, those metallic powders 2 and 3 located on the molded body surface are deformed to spread and firmly bonded together under heat and pressure to form a substantially continuous metallic layer such as the metallic surface layer 1b. If preferable, the continuous metallic surface layer 1b is coated with a metallic plating.

The following Table I indicates another composition ratios and finishing plating of the metallic powder molded article of the present invention applicable to the manufacturing method as described above.

TABLE I

| Example | Resin 10~20% | Inflammable Powders 80~90% | Finishing |
|---|---|---|---|
| A | melamine | copper, aluminum, stainless steel and ceramic | alumite |
| B | dap | brass, stainless steel and ceramic | sulfide mat |
| C | vinyl chloride | red brass, stainless steel and ceramic | sulfide mat |

While two or more kinds of metallic powders are used in the above embodiments for providing an ornamental effect due to different metallic surface colors and patterns, only one kind of inflammable metallic powders may be used. Also, each of the above compositions includes the ceramic powders 5 for improved heat and fire resistance and light-weight, the ceramic powders may be omitted. If included, it is preferable to use the rounded, bead-shaped powders 5 without sharp edges so that they impede the formation of the continuous metallic surface layer 1b. It is to be noted that the above compositions are only examples and other suitable combinations of different materials may equally be used in the present invention.

In the above embodiments, buffing is applied to the entire surface of the metallic powder molded body 10 to form the surface layer 1b, this may be limited only to the area where the fire resistivity is required, and instead of buffing any suitable finishing for applying pressure such as rolling may equally be used.

The resin used may be a thermo-plastic resin as long as it flows at an elevated temperature and not be limited to a thermo-setting resin.

As has been described, according to the present invention, the metallic powder molded article comprises a molded body 1a of a mixture of inflammable metallic powders and synthetic resin, and the molded body 1a has a substantially continuous metallic surface 1b defined by the metallic powders compacted and bonded together. Therefore, the molded body 1a is coated with a substantially continuous inflammable metallic layer 1b and the molded body 1a itself has base material that is inflammable, so that the metallic power molded article 1 exhibits good resistivity to heat and fire. Also, melamine resin 4 is used as a matrix, moldability is good, and since the metallic powders 2 and 3 are in the form of powders, the dimensional stability to heat is good. Further, since the article 1 includes a large amount of metallic powders 2 and 3, it is superior in rigidity, dumping effect, mechanical property and sound shielding effect. Also since the materials to be mixed are powders, materials are not wasted and junk material can also be used, improving economical efficiency. Moreover, since the article 1 is coated with a continuous metallic layer 1b, an ornamental plating can be applied on the surface.

What is claimed is:

1. A metallic powder molded article comprising a molded body of a mixture of inflammable metallic powders and synthetic resin, said molded body having a substantially continuous metallic surface defined by said metallic powders compacted and bonded together and a plated metal layer on said metallic surface.

2. A metallic powder molded article as claimed in claim 1, comprising an aluminum oxide layer.

* * * * *